United States Patent
Owen

(10) Patent No.: US 7,075,676 B2
(45) Date of Patent: Jul. 11, 2006

(54) METHOD FOR ATTACHING FILE AS A BARCODE TO THE PRINTOUT

(75) Inventor: James E. Owen, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 912 days.

(21) Appl. No.: 09/741,199

(22) Filed: Dec. 19, 2000

(65) Prior Publication Data

US 2002/0075507 A1    Jun. 20, 2002

(51) Int. Cl.
*G06F 15/00*    (2006.01)

(52) U.S. Cl. ............ 358/1.18; 358/1.15; 382/306; 235/462.01; 235/462.15

(58) Field of Classification Search .......... 358/1.18; 270/52.02; 235/462.01; 382/306
See application file for complete search history.

(56) References Cited

U.S. PATENT DOCUMENTS

| 5,459,307 | A  | * | 10/1995 | Klotz, Jr. ............... 235/454 |
| 5,644,408 | A  | * | 7/1997  | Li et al. ................. 358/468 |
| 5,848,202 | A  | * | 12/1998 | D'Eri et al. ............. 382/306 |
| 6,201,901 | B1 | * | 3/2001  | Zhou et al. ............. 382/306 |
| 6,484,933 | B1 | * | 11/2002 | Zimmerman et al. ... 235/375 |
| 6,751,352 | B1 | * | 6/2004  | Baharav et al. ......... 382/183 |

FOREIGN PATENT DOCUMENTS

JP    10-157238    6/1998

* cited by examiner

*Primary Examiner*—Joseph R. Pokrzywa
*Assistant Examiner*—Mark R. Milia
(74) *Attorney, Agent, or Firm*—David C. Ripma

(57) ABSTRACT

A method for including a barcode as part of a print job. A user is presented an option to encode and print at least one property of the document as a barcode. Data representative of a document to be printed is rendered. Rendering and encoding may take place in serial or in parallel, with either one of the steps occurring prior to the other. The document to be printed is printed. If the user selects to print the barcodes, the barcodes are then printed.

12 Claims, 1 Drawing Sheet

METHOD FOR ATTACHING FILE AS A BARCODE TO THE PRINTOUT

BACKGROUND

1. Field

This invention relates to printing systems and methods for printing documents, more particularly for methods of printing documents containing barcodes.

2. Background

Barcodes are prevalent as means for allowing machines to convert images of wide or narrow bars into alphanumeric identification codes. One example commonly known is the Uniform Purchase Code (UPC). This code is printed on packaging for items purchased in most stores. Scanners identify the item by converting the image of the bars into a code. The retail computer system can then use that code to identify the item from the store inventory and associate it with the proper price.

Other sorts of barcodes are also common. The US Postal Service uses barcodes imprinted on the bottom of envelopes. This allows postal sorting machines to read the recipient address and sort the envelopes into the appropriate outgoing bin. Consumers can download a software program that allows them to print the appropriate barcode on their own envelopes, facilitating the handling of their mail. These are just two examples of several different types and applications of barcodes. These codes are readable by conventional barcode scanners.

One are in which the use of barcodes would be convenient is in the conversion of hard copies of documents to electronic versions. For example, a document creator gives a hard copy of a document to another person. If the other person desires an electronic copy of the document, that person must either ask the author to provide an electronic copy, such as by e-mail or on diskette, or the document must be scanned. Scanning a document creates images of each page of the document, but to place it in editable format, the images must undergo Optical Character Recognition (OCR). The OCR process is not exactly accurate, so the resulting document typically has to be edited to correct improperly converted text.

It is possible that the author could create barcodes representing the document, but currently that requires special software. It also requires the author to print the document, and then using the software, print it again. The second printing may be accomplished by designating the files within the software, retyping the document piece at a time into the conversion software or cutting and pasting the document. The author is required to print the document twice, once to produce the hard copy of the document, and then again to produce the barcodes. While this allows the recipient of the document to convert the printed barcodes back into the document, it doubles the amount of effort to create the barcodes. This typically results in the author not performing the conversion and having to follow one of the previous approaches, wasting time and effort.

Barcodes, which for purposes of this document will include all machine-readable formats, used to only include limited amounts of information, such as the UPC mentioned above. However, newer methods of encoding information include such things as two-dimensional barcodes that can encode much larger amounts of information than previously.

SUMMARY

One embodiment is a method for including a barcode as part of a print job. The user is offered the option of printing at least one property of the document as barcodes. The method includes rendering data representative of a document to be printed, encoding at least one property of the document to be printed as barcodes and printing the document. The rendering and encoding steps may be performed serially, with either one occurring prior to the other, or in parallel. The user may be allowed to select whether or not the barcode is actually printed on the document, as well as giving a chance to state preferences as the printing of the barcode.

Another embodiment is a user interface that allows control of the printing of the barcodes.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
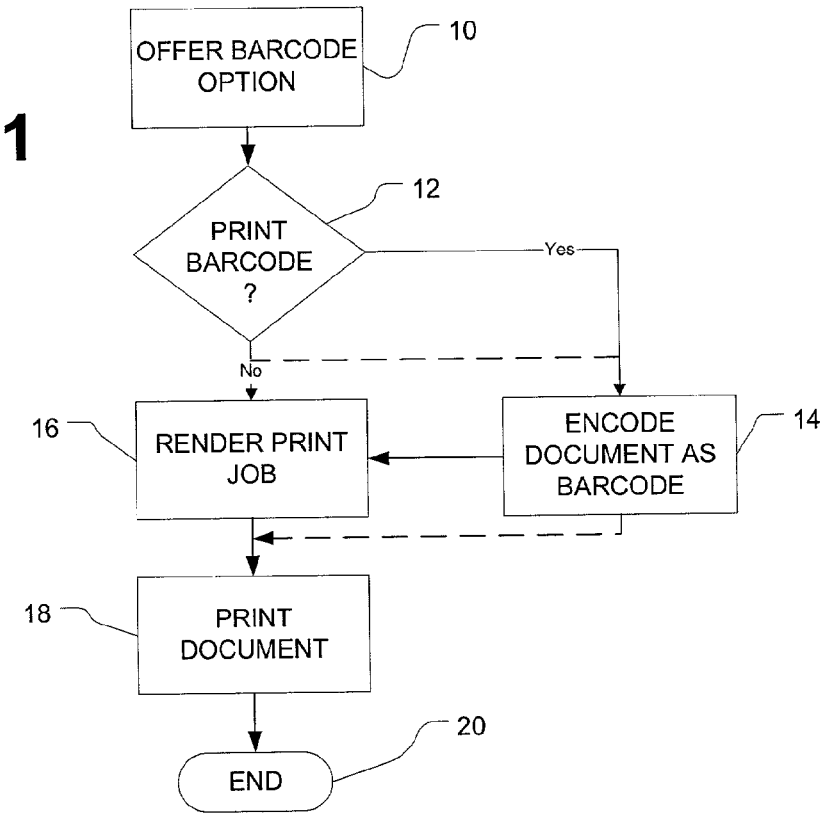
FIG. 1 shows a flow chart of one embodiment of a method to produce a barcode as part of a print job.

One embodiment of a method to produce a barcode as part of a print job is shown in FIG. 1. When the user sends a print job, the request is received at a processor. The processor may be the central system processor, a print processor located in the printer, or some other type of controller, all of which will be referred to as a processor. The processor converts data representing the document to be printed into some sort of standardized print control language.

The sending of the print job usually involves the user sending a print request, such as using the mouse or other user pointing device to select a print button or make a print selection from a menu. When the user makes the selection, a window may appear that allows the user to specify selections such as number of copies, page orientation, etc. Application of the invention will afford the user the ability to select to print at least one property of a document as a barcode. This is shown in 10 of FIG. 1.

At least one property of the document may be converted to barcode. At 12, the user may select to print the barcode or not. As shown in FIG. 1, the process in which the user has selected to print the barcode includes encoding at least one property of the document as a barcode at 14.

As can be seen in FIG. 1, the encoding of at least one property may occur before, during or after the rendering of the document at 16. The two can be done in parallel, with two different parts of one processor, or two different processors performing the respective steps. Alternatively, they could be done in serial fashion, with either process occurring prior to the other. The document will be rendered at 16 whether the user selects to print the barcode or not.

The actual information converted to and printed as barcode will comprise at least one property of the document, as mentioned above. However, unlike the rendering process, this may or may not include the entire document to be printed. Other properties of the document encoded into barcode may include information as to where the electronic copy of the document is stored. In one embodiment, the barcode may identify the machine upon which the file is stored, a network identifier identifying the network upon which the machine resides, and a file name. An alternative embodiment would have the information include a file identifier and a location, where the user could retrieve the file by entering the file identifier. Several other examples of information that could be barcoded into the document are also possible, and the above are only meant as examples.

The information can be printed in several ways at 18. If the user has selected to not print the barcode, the process will follow standard document printing practices. If the barcodes will be printed, one embodiment is to print the barcode on each page, rather than at the end of the document. For some applications, such as faxing, advantages may exist in printing the barcode on each sheet. If a page is lost during transmission of the fax, each page actually received can still be converted into electronic format. In this manner, the steps of 14 and 18 may be performed as one procedure, wherein the barcode is printed as part of each page, rather than at the end of the document. The combined procedure may be repeated as often as necessary until each page is printed.

Similarly, the barcode may be printed at the end of the document starting on a new page, or it may start printing immediately at the end of the printed text, to save paper. These options could be offered to the user in the print options window or windows discussed in more detail below. Many alternatives to the above example exist. The user may or may not select to print the barcode, but the option will be offered to the user.

One manner in which this method can be implemented is in a printer driver file. The driver would then automatically create the barcode version of the document, transparent to the user. Typically, the printer driver would be made available to users on a computer-readable medium, such as a diskette or as a downloadable file.

Another alternative would be for this option to be included in an upgrade to existing document creation applications, such as word processors or spreadsheets as examples. The barcode option may be included in a service package or other accessory package for existing applications.

Figure 2:
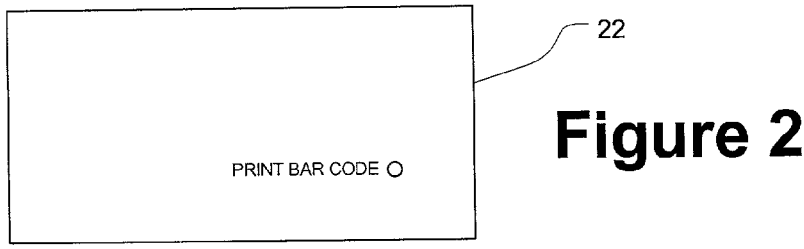
FIG. 2 shows an embodiment of a user interface for making print selections including generation of barcodes.
Figure 3:
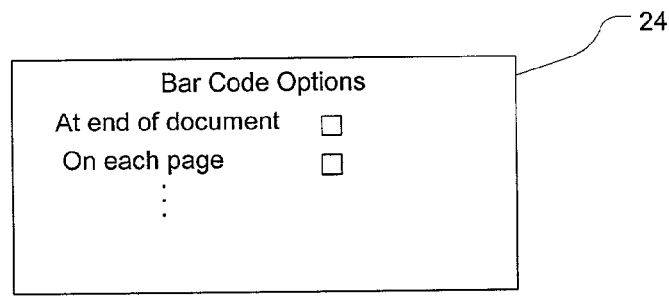
FIG. 3 shows an alternative embodiment of a user interface for making print selections including generation of barcodes.

Once installed, the barcode generation will probably be transparent to the user. However, as mentioned above, the user could select to have the barcode printed or not. As shown in FIG. 2, the option to print barcode or not may be included in a print window 22 generated when a user selects the print option from whichever document creation application the user is running. When the window 22 is presented to the user, the user can select to print the barcode or not. After the user selects to print the barcode, a second window may pop up, such as 24 shown in FIG. 3, which allows the user to select specifics about the printing of the barcode.

As a simpler alternative, the user may not be allowed to select to print the barcode. The barcode may just be printed as the default. Similarly, the options of printing on each page or at the edge, among other preferences may or may not be offered to the user, whether the user is offered the option or not.

Thus, although there has been described to this point a particular embodiment for a method and apparatus for attaching barcodes to printed documents it is not intended that such specific references be considered as limitations upon the scope of this invention except in-so-far as set forth in the following claims.

What is claimed is:

1. A method for including a barcode as part of a print job, the method comprising:
   receiving a print request for an original electronic document;
   offering a user an option to print the entire original electronic document as a barcode;
   rendering or converting data representative of the original electronic document into a format for printing as a printed document;
   encoding the same entire original electronic document used for generating the rendered or converted data representative of the document into the barcode, the barcode encoded from the entire original electronic document independently of the rendered data representative of the document, any other converted data representation of the original electronic document, and any printed version of the original electronic document;
   combining the rendered data representation of the original electronic document with the barcode generated from the original electronic document; and
   printing the combined rendered data representation of the original electronic document and the barcode representation of the entire original electronic document in a same printed document.

2. The method of claim 1 wherein the entire contents of the original electronic document are encoded into a barcode prior to the electronic document being rendered.

3. The method of claim 1 wherein the barcode is printed at the end of the document to be printed.

4. The method of claim 1 wherein the barcode is printed on each page of the document to be printed.

5. The method of claim 1 wherein the entire original electronic file of the document produced by a document creation application is encoded into the barcode prior to the same original electronic file being transformed into a print job rendering.

6. A user interface, comprising:
   an identifier identifying an original electronic document generated by a document creation application; and
   a selection option that allows a user to specify printing of a barcode encoded version of the entire original electronic document to be printed independently of a rendered version of the same original electronic document and then combining the barcode encoded version of the entire original electronic document with the rendered version of the same electronic document so that the entire original non-rendered electronic document can be recreated from the barcode printed in the rendered version of the electronic document.

7. The user interface of claim 6, wherein the user interface is part of a standard user interface for printing that allows the user to specify different properties contained in the original electronic version of the document for encoding into the bar code prior to the printer control language rendering the electronic document into a print file for printing.

8. The user interface of claim 6, wherein the barcode for the original electronic document is encoded before, or in parallel with, the rendering of the electronic document into the print file.

9. The user interface of claim 6, wherein the selection includes a designation as to the barcode location.

10. A computer-readable medium having included on it software code, that when executed, results in:
    using a print driver for offering options to a user for printing barcodes;
    encoding an entire original electronic document to be printed into barcodes according to the options provided by the print driver using a non-rendered version of the document;
    rendering the document;
    printing the rendered version of the document; and
    printing the barcodes representing the entire original electronic document with the rendered version of the document, if the user selected options in the print driver to print the barcodes.

11. The computer-readable medium of claim 10, wherein the medium further comprises an optional upgrade to an existing file.

12. A system for encoding a barcode as pan of a print job, comprising:

a processor operating a document creation application for generating an electronic document, the document creation application including a service software package that provides a print request of the electronic document using a print driver and offering a user an option in the print request to encode the entire original electronic document as a barcode prior to and independently from a subsequent rendering of the electronic document, the processor then combining the encoded barcode with the rendered electronic document into a print file for outputting to a printer.

* * * * *